UNITED STATES PATENT OFFICE 2,224,849

PROCESS AND PRODUCTS RELATING TO GLYCIDOLS

Herbert P. A. Groll and George Hearne, Berkeley, Calif., assignors to Shell Development Company, San Francisco, Calif., a corporation of Delaware No Drawing. Application November 6, 1937, Serial No. 173,249

20 Claims. (Cl. 260—348)

This invention relates to a novel process for the treatment of halogenated polyhydric alcohols wherein the carbinol groups are either of primary or secondary character and wherein the hydroxy groups are in excess of the halogen atoms in the compound. The invention also relates to certain new and useful hydroxy-epoxides.

More particularly, the invention relates to a practical and economical process for the production of glycidols (hydroxy-epoxides) wherein the carbon atoms embraced in the epoxy structure are of primary or secondary character, that is, linked to no more than two other carbon atoms, which comprises reacting a halogenated polyhydric alcohol of the class herein defined with a relatively dilute acqueous solution of a basic or basic-acting compound under conditions at which the desired glycidol is formed at a practical rate while hydration of said glycidol is substantially obviated.

The present invention provides a general method for the conversion of halogenated polyhydric alcohols, wherein the carbinol groups are of primary and/or secondary character and wherein the hydroxy groups are in excess of the halogen atoms, to glycidols (hydroxy-epoxides) and/or their corresponding hydration products. The main reaction product may be a glycidol or its corresponding hydration product depending upon which type of compound is desired. The invention may be executed in such a manner and under such conditions that substantially only a glycidol, substantially only the glycidol hydration product, or the desired mixture of said products is obtained. The invention is of great technical importance because of the fact that it is easily and economically executed to obtain glycidols from glycerine monohalohydrins and related halogenated polyhydric alcohols, in good practical yields, and in aqueous solution with inexpensive and readily available reactants. The invention provides means for recovering the glycidols from the aqueous solutions in which they are prepared in a substantially pure and anhydrous condition with negligible losses due to hydration and other undesirable side reactions.

The halogenated polyhydric alcohols which may be treated in accordance with the process of the invention may be of aliphatic, aralkyl or alicyclic character. Suitable halogenated polydric alcohols contain at least one halogen atom and at least two carbinol groups of primary and/or secondary character. It is to be understood that a suitable alcohol may be of mixed character, that is, it may possess primary as well as secondary carbinol groups. A representative suitable alcohol of this type is the glycerine monochlorhydrin of the formula:

$$CH_2OH-CHOH-CH_2Cl$$

The halogenated polyhydric alcohols may be saturated or unsaturated. For example, unsaturated halogenated polyhydric alcohols such as $$CH_2=CH-CHOH-CHOH-CH_2Cl$$

are applicable.

A preferred group of suitable halogenated polyhydric alcohols includes, among others, the compounds:

$$CH_2OH-CHOH-CH_2-Hal$$
$$CH_3-CHOH-CHOH-CH_2-Hal$$
$$C_2H_5-CHOH-CHOH-CH_2-Hal$$
$$C_2H_5-CHOH-CH(Hal)-CH_2OH$$

$$CH_2OH-CH(Hal)-CH_2OH$$
$$CH_3-CHOH-CHOH-CH-(Hal)-CH_3$$
$$C_3H_7-CHOH-CHOH-CH_2-Hal$$
$$CH_3-CHOH-CHOH-CH(Hal)-C_2H_5$$

$$CH_2OH-CHOH-CHOH-CH_2-Hal$$

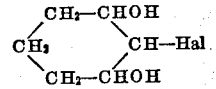

and the like and their homologues, analogues and suitable substitution products.

A suitable group of halogenated polyhydric alcohols includes those wherein a halogen atom and a hydroxy group are linked, respectively, to vicinal carbon atoms. These compounds will yield products containing, besides one or a plurality of carbinol groups, an epoxy group

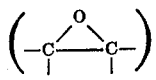

wherein the epoxy oxygen linkage is between two vicinal carbon atoms. We may also react halogenated polyhydric alcohols, such as the compound $$CH_2OH-CHOH-CH_2-CH_2Cl$$

wherein a halogen atom and a hydroxy group are not linked, respectively, to vicinal carbon atoms and obtain glycidols containing epoxy groups such as

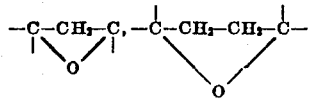

and the like.

The source of the treated halogenated polyhydric alcohol is immaterial. Suitable glycerine monohalohydrins and alpha-substituted glycerine monohalohydrins, for example, may be obtained by halohydrination of the corresponding unsaturated alcohols.

The invention is executed by reacting a halogenated polydric alcohol of the type herein described with a relatively dilute aqueous solution or suspension of a suitable alkaline or alkaline reacting compound. Suitable basic compounds are the metal oxides, the metal hydroxides, the metal carbonates, the metal bicarbonates, the metal borates, etc. Preferably employed basic compounds are the alkali metal hydroxides. In some cases, where it may be desirable, ammonia, basic ammonium compounds and organic bases such as the amines, hydroxyl amine, etc., may be used.

The basic compound is preferably employed as a solution or suspension in a relatively large amount of water. Aqueous solutions or suspensions wherein the water is in substantial gravimetric excess of the basic acting compound are preferred. Aqueous alkaline solutions having a normality in the range of from about 0.1 normal to about 8 normal are in general quite suitable. Two normal aqueous NaOH and KOH solutions may in most cases be employed with excellent results.

The process of the invention may be executed in a variety of manners in a variety of suitable types of apparatus. In general, when substantially only the corresponding glycidol (hydroxy-epoxide) is desired as the reaction product, an amount of the basic compound substantially equivalent to the reactive hydrogen halide content of the halogenated polyhydric alcohol is contacted with the halogenated polyhydric alcohol and a relatively large amount of water in a suitable reaction vessel equipped with means for cooling and/or heating and effecting efficient mixing of its contents.

In the majority of cases, the reaction is initiated on contact of the reactants at room temperature. The reaction is exothermic and sufficient heat is usually liberated to permit one to conduct the reaction at the desired temperature without resorting to external heating means. External heating means, as well as external cooling means, may be utilized when necessary or desirable. In some cases, the heat liberated in the course of the reaction may be utilized to aid or to effect distillation of the hydroxy-epoxide from the aqueous reaction mixture when such a mode of recovery of the product is desired.

To prevent any substantial hydration of the formed hydroxy-epoxide, and particularly when the hydroxy-epoxide possesses an epoxy oxygen atom linked to two vicinal carbon atoms, the temperature of the reaction mixture is preferably not allowed to exceed about 50° C. For the production of the more stable hydroxy-epoxides, for example, those wherein an epoxy oxygen atom joins non-vicinal carbon atoms, higher temperatures may be used advantageously. It is not our intent to limit the successful execution of the invention to any specific temperature range. The optimum temperature will depend upon the particular reactants used.

On the substantial completion of the primary reaction resulting in the formation of the hydroxy-epoxide, the hydroxy-epoxide is promptly recovered from the aqueous reaction mixture under conditions at which its hydration is substantially obviated. The recovery of the hydroxy-epoxide from the aqueous mixture may be accomplished in a variety of manners, for example, by extraction with a suitable selective solvent by freezing out, or by distillation.

The recovery step of the process is preferably executed by extracting the neutral, slightly basic or slightly acidic aqueous reaction mixture with a suitable selective solvent for the hydroxy-epoxide. Suitable selective solvents for this purpose are the ethers such as ethyl ether, propyl ether, diisopropyl ether, methyl tertiary butyl ether, diallyl ether, methyl tertiary amyl ether, etc.; the hydrocarbons such as pentane, the hexanes, benzene, petroleum ether and the like hydrocarbons and hydrocarbon fractions; the chlorinated hydrocarbons, the carboxylic acid esters and the like. The aliphatic esters are particularly suitable extractants. The extraction may be effected in any convenient manner, for example, by treating the aqueous glycidol containing mixture in a conventional continuous extraction apparatus with the extractant. The extracted hydroxy-epoxide may be separated from its solution with the extractant by subjecting said preferably anhydrous extractant solution to a distillation operation, under reduced pressure if necessary or desirable.

Another mode of recovering the hydroxy-epoxide from the aqueous reaction mixture while substantially avoiding hydration and other undesirable side reactions comprises subjecting the substantially neutral aqueous reaction mixture to a distillation. The required amount of a suitable acid or acid-acting agent may be added to the basic reaction mixture to render the same substantially neutral. The distillation, or evaporation of the water, from the neutral reaction mixture may be effected at kettle temperatures sufficiently low to obviate the occurrence of the hydration reaction by resorting to the use of subatmospheric pressures. When the reaction to form the hydroxy-epoxide is effected with a basic metal compound, the reaction mixture will contain a metal halide which may or may not be in solution therein. If the salt is present as a solid, it may be separated prior to or after removal of all or a part of the water. Separation of the solid salt may be effected by any suitable means such as filtration, decantation, centrifugation, etc.

The following examples illustrate suitable modes of executing the process of the invention. The invention is not to be considered as restricted to the specific reactants and mode of operation illustrated by the examples.

*Example I*

About 110.5 gm. (1 mol) of glycerine monochlorhydrin ($CH_2OH$—$CHOH$—$CH_2Cl$) were added to about 500 c. c. of an aqueous 2N sodium hydroxide solution (about 1 mol of NaOH) and the mixture stirred at room temperature for about 10 minutes. At the end of this time the reaction mixture was charged to a continuous extraction apparatus and extracted with ethyl ether for about 12 hours.

The ether extract liquid was dried and fractionated. After removal of the ether, the residue in the still was substantially pure glycidol

having an atmospheric boiling temperature of from about 160° C. to 162° C. About 37 gm. (0.5 mol) of the glycidol was obtained, representing a yield of 50% on the applied chlorhydrin.

Example II

About one mol of glycerine monochlorhydrin was added to about 500 c. c. of an aqueous 2N solution of sodium hydroxide and the mixture stirred at room temperature for about 10 minutes.

The water was then distilled from the reaction mixture by reducing the pressure on the distillation system and maintaining the still kettle temperature at or below about 50° C. When substantially all of the water had been removed by distillation, the residue, which contained solid salt, was washed with anhydrous ethyl alcohol. The alcohol solution was separated from the solid salt and distilled.

After removal of the alcohol, the residue in the still was substantially pure glycidol. The glycidol was obtained in good yield.

Example III

A crude aqueous solution of glycerine monochlorhydrin, which analyzed about 0.03N in free hydrochloric acid and about 4.97N in saponifiable chloride, was treated at about 8° C. with substantially the amount of an 18N sodium hydroxide solution required to neutralize the free acid and react with the monochlorhydrin. The caustic solution was added slowly with vigorous stirring of the mixture. After about the required amount of caustic had been added, the mixture was allowed to stand for about 30 minutes, neutralized with carbon dioxide, filtered to remove sodium chloride, and the filtrate extracted with tertiary amyl alcohol. The alcohol phase was distilled under reduced pressure to recover the glycidol. About 333 grams of glycidol were recovered for each two liters of chlorhydrin solution treated, the yield being about 45%. The aqueous phase of the extraction was hydrolyzed at about 150° C., and distilled to recover the glycerol formed as a by-product.

Example IV

A mixture of crotyl alcohol and methyl vinyl carbinol was chlorhydrinated and an aqueous solution analyzing about 2.36N in free hydrochloric acid and about 2.34N in saponifiable chloride obtained. This solution was treated, at a temperature of about 10° C., with an amount of an 18N sodium hydroxide sufficient to neutralize the free acid and react with the chlorhydrin. The reaction mixture was filtered, and the filtrate extracted with ethyl ether and then with tertiary amyl alcohol. The combined solvent phase was distilled under reduced pressure to recover methyl glycidol. The methyl glycidol boiled at about 56° C. to 58° C. under a pressure of about 10 mm. of mercury. About 200 gm. of methyl glycidol were recovered for each 1.7 liters of the chlorhydrin solution treated, representing a yield of about 57.5%.

Example V

Hexene-2 ol-4, prepared by reacting acrolein with ethyl magnesium bromide, was chlorhydrinated using tertiary butyl hypochlorite as the source of hypochlorous acid. An aqueous solution of the resulting chlorhydrin was treated with substantially an equivalent quantity of a 6.5N sodium hydroxide solution, and the reaction mixture extracted with ethyl ether to recover the glycidol therefrom. The glycidol was obtained in a yield of about 42%.

In like manner, phenyl vinyl carbinol and dodecyl propenyl carbinol were chlorhydrinated, the chlorhydrins converted to the corresponding glycidols, and the glycidols recovered from the reaction mixture by extraction.

It is seen that by operating in accordance with the process glycerol can be made a valuable by-product in the production of glycidol, or glycidol can be made a valuable by-product of glycerine. For example, in the production of glycidol it is not necessary that the process be executed to obtain a high yield of glycidol. The halohydrin which is not converted to glycidol is for the most part converted to glycerol which is a valuable by-product of the glycidol process. Accordingly, it is in some cases desirable to operate so that both products are obtained.

It will be evident to those skilled in the art that the invention may be executed in a batch, intermittent or continuous manner. In a continuous mode of operation, the reaction may be effected in a suitable reaction stage in communication with one or a plurality of recovery stages wherein removal of water or the hydroxy-epoxide from the reaction mixture is continuously effected by extraction and/or distillation means.

The glycidols (hydroxy-epoxides) obtainable by execution of the process of the invention are valuable compounds which are useful for a wide variety of solvent, extraction and preparation purposes. They may be employed as extractants in numerous vegetable, animal and mineral oil extraction processes. They are valuable intermediates in the preparation of many useful organic compounds such as polyhydric alcohols, polyhydric alcohol ethers and esters, glycidol ethers and esters, carbonylic compounds, etc.

The glycidols prepared in accordance with the process of the invention from the alpha-substituted glycerine monohalohydrins containing at least five carbon atoms and the alpha, alpha'-substituted glycerine monohalohydrins are novel compounds. These novel compounds, which contain at least five carbon atoms to the molecule, may be represented by the general formula:

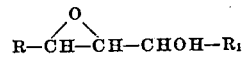

wherein R represents an alkyl, aralkyl or cycloaliphatic radical which may be saturated or unsaturated and which may or may not be further substituted, and wherein $R_1$ represents a hydrogen atom or an organic radical which may or may not be the same as the radical represented by R. A preferred subgroup of such novel glycidols comprises those wherein R represents an alkyl radical containing at least two carbon atoms and $R_1$ represents a hydrogen atom or an alkyl radical.

We claim as our invention:

1. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom, with a basic-acting compound in the presence of a substantial amount of water at a temperature at which the hydroxy-epoxide product is substantially stable, and recovering the hydroxy-epoxide from the aqueous reaction mixture.

2. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic metal compound in the presence of a substantial amount of water at a temperature at which the hydroxy-epoxide product is substantially stable, and recovering the hydroxy-epoxide from the aqueous reaction mixture.

3. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic metal compound in the presence of a substantial amount of water at a temperature not greater than about 50° C., and recovering the hydroxy-epoxide from the aqueous reaction mixture.

4. A process for the conversion of a halogenated polyhydric alcohol to the corresponding hydroxy-epoxide which comprises reacting a halogenated polyhydric alcohol, wherein the carbinol groups are in excess of the halogen atoms in the molecule, wherein each hydroxylated carbon atom and each halogenated carbon atom is linked directly to at least one hydrogen atom and wherein a halogen atom and a hydroxy group are linked, respectively, to vicinal carbon atoms, with a basic metal compound in the presence of a substantial amount of water at a temperature not greater than about 50° C., and recovering the hydroxy-epoxide from the aqueous reaction mixture.

5. A process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with a basic metal compound in the presence of a substantial amount of water at a temperature at which the glycidol is substantially stable, and recovering the glycidol from the aqueous reaction mixture.

6. A process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with substantially the stoichiometrical quantity of an aqueous alkali metal hydroxide solution having a concentration of from about 0.1 N to about 8 N at a temperature not greater than about 50° C., and recovering the glycidol from the aqueous reaction mixture.

7. A process for the production of glycidol which comprises reacting glycerin monochlorhydrin with substantially the stoichiometrical quantity of an aqueous 2N solution of sodium hydroxide at a temperature not greater than about 50° C., and recovering the glycidol from the aqueous reaction mixture.

8. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic-acting compound in the presence of a substantial amount of water at a temperature at which the hydroxy-epoxide product is substantially stable, and recovering the hydroxy-epoxide from the aqueous reaction mixture by extraction with a liquid selective solvent for the hydroxy-epoxide.

9. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic-acting compound in the presence of a substantial amount of water at a temperature at which the hydroxy-epoxide product is substantially stable, subjecting the resulting aqueous reaction mixture to extraction with a liquid organic solvent for the hydroxy-epoxide, and distilling the extract phase to recover the hydroxy-epoxide in a substantially anhydrous condition.

10. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic-acting compound in the presence of a substantial amount of water at a temperature at which the hydroxy-epoxide product is substantially stable, subjecting the resulting aqueous reaction mixture to extraction with an aliphatic ether, and distilling the extract phase to recover the hydroxy-epoxide in a substantially anhydrous condition.

11. In a process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with a basic metal compound in the presence of a substantial amount of water at a temperature at which the glycidol is substantially stable, subjecting the resulting aqueous reaction mixture to extraction with a liquid organic solvent for the glycidol, and distilling the extract solution to recover the glycidol in a substantially anhydrous condition.

12. A process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with a basic metal compound in the presence of a substantial amount of water at a temperature at which the glycidol is substantially stable, subjecting the resulting aqueous reaction mixture to extraction with an aliphatic ether, and distilling the ether-glycidol solution to recover the glycidol in a substantially anhydrous condition.

13. A process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with a basic metal compound in the presence of a substantial amount of water at a temperature at which the glycidol is substantially stable, subjecting the resulting aqueous reaction mixture to extraction with ethyl ether, and distilling the ether-glycidol solution to recover the glycidol in a substantially anhydrous condition.

14. A process for the conversion of a halogenated polyhydric alcohol to the corresponding hydroxy-epoxide which comprises reacting a halogenated polyhydric alcohol wherein the carbinol groups are in excess of the halogen atoms in the molecule and wherein each hydroxylated and each halogenated carbon atom is linked directly to at least one hydrogen atom with a basic-acting compound in the presence of a substantial amount of water at a temperature at which the hydroxy-epoxide product is substantially stable, neutralizing the aqueous reaction mixture, and distilling the substantially neutral reaction mixture to recover the hydroxy-epoxide in a substantially anhydrous condition.

15. A process for the conversion of a glycerin monohalohydrin wherein each hydroxylated carbon atom and each halogenated carbon atom is linked directly to at least one hydrogen atom to the corresponding glycidol which comprises reacting the glycerin monohalohydrin with a basic metal compound in the presence of a substantial amount of water at a temperature at which the glycidol is substantially stable, and distilling the substantially neutral aqueous reaction mixture at a temperature below about 50° C. to recover the glycidol in a substantially anhydrous condition.

16. In a process for the production of a glycidol by reacting a glycerine halohydrin wherein each hydroxylated carbon atom and each halogenated carbon atom is linked directly to at least one hydrogen atom with an aqueous solution of an alkali metal hydroxide, the step of recovering the glycidol from the aqueous reaction mixture which comprises extracting the aqueous reaction mixture with an aliphatic ether, and distilling the ether-glycidol solution to recover the glycidol in a substantially anhydrous condition.

17. The glycidols of the general formula

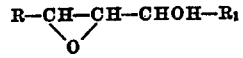

which contain at least five carbon atoms and wherein R represents a radical of the group consisting of the alkyl, aralkyl and alicyclic radicals, and $R_1$ represents a substituent of the group consisting of the hydrogen atom and the hydrocarbon radicals.

18. The glycidols of the general formula

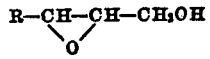

wherein R represents an alkyl radical containing at least two carbon atoms.

19. The glycidols of the general formula

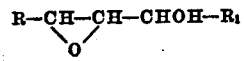

wherein R and $R_1$ are alkyl radicals.

20. In a process for the production of a hydroxy-epoxide by reacting a halogenated polyhydric alcohol wherein each hydroxylated carbon atom and each halogenated carbon atom is linked directly to at least one hydrogen atom wherein the carbinol groups are in excess of the halogen atoms with a basic metal compound in the presence of a substantial amount of water, the step of recovering the hydroxy-epoxide from the aqueous reaction mixture which comprises extracting the aqueous reaction mixture with a liquid organic solvent for the hydroxy-epoxide, and distilling the extract solution to recover the hydroxy-epoxide in a substantially anhydrous condition.

HERBERT P. A. GROLL.
GEORGE HEARNE.